July 10, 1962 J. A. NORTHCOTE ET AL 3,043,082
BELT SHIELDS FOR STALK CUTTERS
Filed Feb. 26, 1960
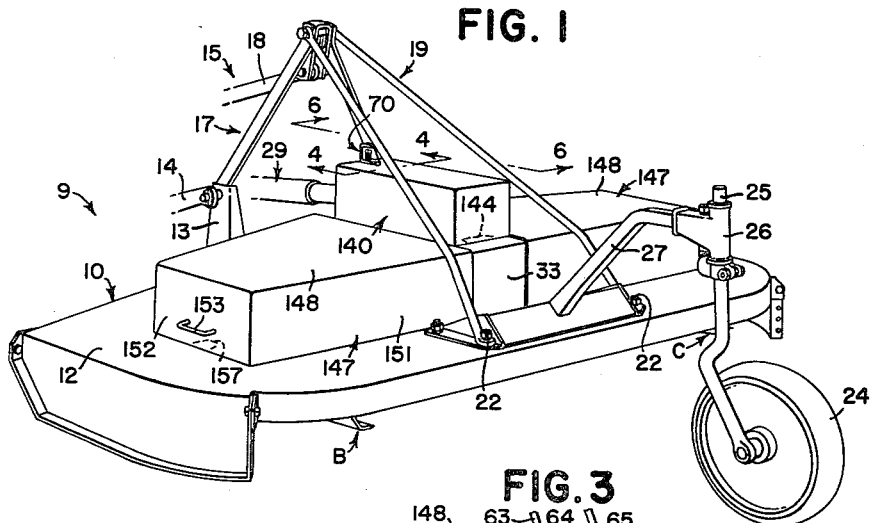
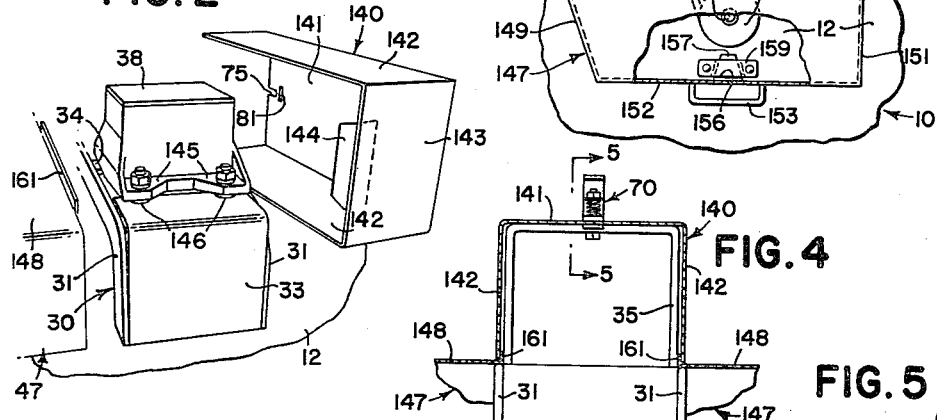
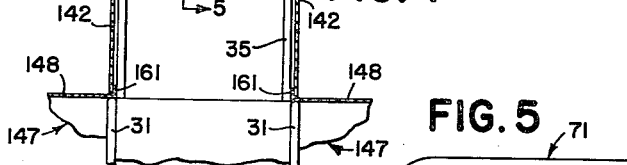
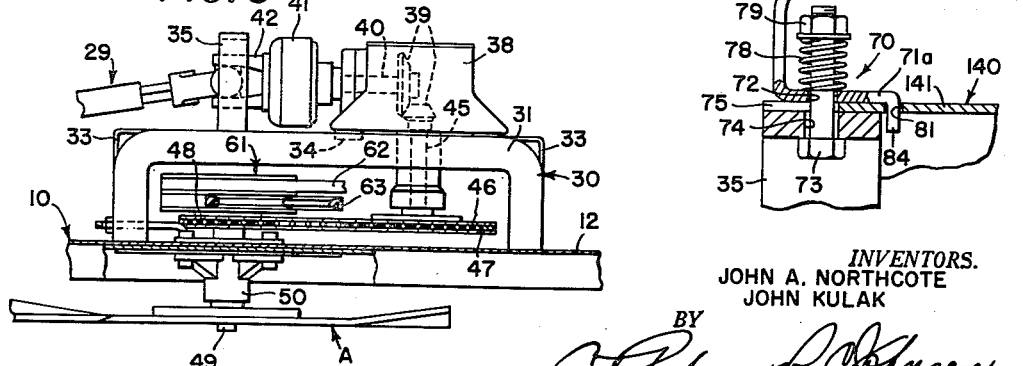
INVENTORS.
JOHN A. NORTHCOTE
JOHN KULAK
BY
ATTORNEYS United States Patent Office 3,043,082
Patented July 10, 1962

3,043,082
BELT SHIELDS FOR STALK CUTTERS
John A. Northcote, Welland, Ontario, Canada, and John Kulak, Port Colborne, Ontario, Canada, assignors to Deere & Company, Moline, Ill., a corporation of Delaware
Filed Feb. 26, 1960, Ser. No. 11,262
4 Claims. (Cl. 56—503)

This invention relates generally to agricultural implements and more particularly to tractor-carried and tractor-propelled rotary cutters used primarily for cutting, shredding and disintegrating brush, crop stalks, and other growth, all of which is reduced to a mulch that not only conserves moisture but also aids in clean plowing.

The object and general nature of this invention is the provision of a new and improved rotary cutter having a housing construction whereby the drive belts and other parts are protected by quick detachable shields that are readily detached when required, such as for tightening or adjusting or replacing the drive belts, or otherwise servicing the drive means. Specifically, one feature of this invention is the provision of one or more side shields and a center shield, so constructed and arranged that the side shield or shields are held in place by the center shield without requiring separate latches or the like for each side shield.

These and other objects and advantages of this invention will be apparent to those skilled in the art after a consideration of the following detailed description, taken in conjunction with the accompanying drawings, in which:

FIG. 1 is a perspective view showing a rotary cutter of a multi-rotor type, including a plurality of rotors, in which the principles of this invention have been incorporated.

FIG. 2 is an enlarged fragmentary perspective showing the bevel gear drive unit, which is connected to drive the several rotors, with the center shield and one of the side shields disposed in disassembled position.

FIG. 3 is an enlarged fragmentary plan view, showing the interlocking means between the outer end of each side shield and the associated main frame or housing of the rotary cutter.

FIG. 4 is an enlarged sectional view, with the shaft 40 and bevel gears 39 omitted, taken generally along the line 4—4 of FIG. 1.

FIG. 5 is an enlarged view taken generally along the line 5—5 of FIG. 4, showing the latch interconnecting the center or bevel gear housing to the supporting frame therefor.

FIG. 6 is an enlarged sectional view taken along the vertical plane of the line 6—6 of FIG. 1, the shields being omitted.

The principles of the present invention have been shown by way of illustration as incorporated in a rotary cutter having three substantially driven rotor elements indicated at A, B and C in FIGS. 1 and 6. The rotary cutter 9 in which this invention has been incorporated includes a main frame 10 in the form of a generally transverse horizontal housing 10 supported on suitable frame bars and includes a generally flat upper sheet 12. The forward portion of the frame 10 carries a pair of upwardly extending brackets 13 to which the two lower draft links 14 (only one of which can be seen in FIG. 1) of a tractor-carried three-point hitch structure 15 are connected. The main frame 10 also carries a generally vertical mast section 17 to the upper portion of which the upper link 18 of the hitch structure is connected. Brace structure 19 extends from the upper portion of the mast section 17 outwardly and rearwardly to the rear portion of the frame 10, being fixed to the latter by bolts 22. A rear wheel 24 is shown in FIG. 1 as rotatably mounted on the lower end of a vertical spindle 25 journaled in a sleeve member 26 carried by an upwardly and rearwardly extending bracket 27 that is fixed, as by welding or the like, to the rear central portion of the frame 10. Thus, the rotary cutter of this invention is supported at its front on the tractor hitch structure 15 and at its rear on a castering wheel unit 24, 25. The entire rotary cutter is raised relative to the tractor by suitable actuation of the tractor-carried power lift means, as is generally conventional for this type of implement. The rotors of the unit 9 are driven by power delivered thereto from the tractor by the usual telescoping power shaft 29 connected in any suitable way with the power take-off shaft of the tractor.

The rotary cutter 9 carries, generally centrally of the frame or housing 10, a bevel gear housing support frame 30 that is made up of two generally vertically disposed U-shaped bars 31 and interconnecting means including front and rear L-shaped plate portions 33, a center cross bar 34, and a forward upwardly extending yoke 35. The main support 30 carries a bevel gear housing 38 (FIG. 6) in which a pair of bevel gears 39 are carried, one being driven through a shaft 40 that is connected at its forward end with a slip clutch safety unit 41, and the latter is driven from the rear end of the power shaft 29 through a universal joint 42. The other bevel gear, which is disposed in horizontal plane, is connected to the upper end of a rotor shaft or spindle 45 journaled in the housing 38 and carrying at its lower end a drive sprocket 46. A chain 47 connects the drive sprocket 46 with the pinion 48 on the upper end of a rotor shaft 49 that is journaled for rotation in a bearing sleeve 50 carried by the frame 10, and the bearing sleeve 50 may be adjusted in a generally fore-and-aft direction by any suitable means. The lower end of the shaft carries the center rotor A.

The upper end of the rotor shaft 49 carries a double grooved drive pulley 61 and the latter receives a pair of drive belts 62 and 63, one belt extending laterally outwardly to the rotor unit B while the other extends in the generally opposite direction to the rotor unit C. Each of the rotor shafts 64 (FIG. 3) of the units B and C carries a belt pulley 65 fixed thereto and receiving the outer end of the associated belt 62 or 63, and the rotor shafts 64 of the units B and C are adjustable in a generally fore-and-aft direction relative to the frame 10 by any suitable means.

According to this invention, shield means is provided for covering not only the laterally outwardly extending belts 62 and 63 and associated parts, but also the safety clutch 41, drive chain 47, and associated parts disposed adjacent to or carried by the gearing housing support 30. Preferably, we provide a center shield and two side shields.

The center shield is indicated by the reference numeral 140 and comprises a generally rectangular structure having a top wall 141, opposite side walls 142, and a rear wall 143, the shield 140 being open at the lower side and forward end, as best shown in FIG. 2. The rear wall 143 of the center shield 140 carries a forwardly extending tongue 144 that when the shield 140 is in place, engages under a ledge 145 of the housing 38 between two mounting bolts 146 (FIG. 2). Each of the two side shields is indicated by the reference numeral 147 and each shield member 147 includes a top wall 148, front and rear walls 149 and 151 (FIG. 3), and an outer end wall 152, the shields 147 being open at the lower portions. The end wall 152 of each side shield carries a manipulating handle 153 and each wall 152 also carries a projecting member 156 formed as an angle and having a laterally inwardly extending tongue or projection 157 that is made with laterally inwardly converging edges. The member 156 is secured, as by welding, to the inner face of the end wall 152. The tongue or projection 157 is adapted, when the shield 147 is mounted in place on the main housing 10, to enter a generally U-shaped securing clip 159 mounted on and secured to the adjacent portion of the upper sheet or wall 12 of the housing by any suitable means. Also, the laterally inner edge of the upper plate 148 of each shield 147 is provided with a laterally inwardly disposed and upwardly extending flange 161 that, as best shown in FIG. 4, lies in a plane laterally inwardly of the plane of the adjacent U-shaped member 31. Also, the laterally inner portion of each shield 147 is shaped and dimensioned so as to fit snugly over the associated U-shaped support member 31, whereby displacement of the inner portion of the shield 147 in a fore-and-aft direction is limited by the associated support member 31. Displacement of the laterally outer portion of each shield member 147 is limited by the engagement of the tongue or projection 157 in the associated clip 159, each clip being shaped to receive the inwardly converging edges of the associated tongue 157.

The two shields 147, each with its upstanding flange 161, are adapted to be locked in place by the center shield 140. To this end, the latter is dimensioned so that when the laterally extending shields 147 are in place, the flanges 161 lie inside the sides 142 of the center shield 140, as best shown in FIG. 4, the shield 140 being adapted to be mounted in position, after the shields 147 are in place, by shifting the shield 140 forwardly until the tongue 144 fits under the ledge 145 and the front end of the shield 140 is supported on the forward yoke 35 of the support unit 30, the sides 142 embracing the flanges 161.

Suitable latch means 70, best shown in FIG. 5, is provided for releasably holding the center shield 140 in position. The latch mechanism 70 comprises a handle member 71 in the form of a generally U-shaped bar apertured at 72 to receive a bolt 73, the lower end of which is disposed in an opening 74 in the central portion of the yoke 35. The bolt 73 also extends through a slot 75 in the upper wall 141 of the shield 140. A biasing spring 78 is disposed between a nut 79 on the upper end of the bolt 73 and the adjacent lower portion 71a of the latch member 71. The spring 78 thus biases the latch toward its shield-engaging position. The shield is provided not only with the above mentioned slot 75 but also an opening 81. The slot accommodates the passage of the shield member 140 past the bolt 73 and into position on the yoke in which the lower detent end 84 of the latch 71 may enter the opening 81 in the forward end of the shield 140. Thus, when the latch 70 is engaged with the shield 140, the latter is held in position on the support 30, and at the same time the side walls 142 of the shield 140 engage the flanges 161 on the side shields 147 to lock or retain the latter in position on the housing 10. In this way, the drive parts, including the belts 62 and 63, are protected, yet when access to the drive parts is necessary, the shields 140 and 147 may readily be removed with a minimum expenditure of time and effort.

Having described the preferred form of our invention, what we claim and desire to secure by Letters Patent is:

1. In a rotary implement including a generally horizontal rotor housing, a rotor disposed therein, a vertical shaft carrying said rotor at its lower end and extending upwardly from the housing at its upper end, a belt pulley fixed to the upper end of said vertical shaft, and means to drive said shaft including a drive pulley aligned with said belt pulley and a belt connecting said pulleys, the combination therewith of shield means for said belt comprising a shield housing, a projection fixed to one wall of the latter housing and extending therefrom, a clip carried by said rotor housing to receive said projection when the shield housing is disposed over said belt, a support on said rotor housing adapted to receive the portion of the shield housing generally opposite said clip, and shaped so as to receive and support said shield housing when the latter is shifted in a direction to engage said projection under said clip, means forming an upturned portion on said shield housing extending in a direction generally perpendicular to the direction of movement of said shield housing when engaging said projection with said clip and the generally opposite portion of the latter shield with said support, and means carried by said support for movement in said perpendicular direction and having means engageable with said upturned edge for locking said shield housing in belt protecting position.

2. In a multi-rotor rotary stalk cutter having a main housing at least partially enclosing said rotors, and drive means for said rotors including a shaft for each rotor extending upwardly from said housing, a bevel gear unit carried by said housing and connected to drive one of said rotor shafts, and belt and pulley means to drive the other rotor shaft or shafts from said one shaft, the combination therewith of shield means for said bevel gear unit and said belt and pulley means, said shield means including a first shield member covering at least a portion of said belt and pulley means and extending toward said bevel gear unit, means to fix the outer portion of said first shield member to the adjacent portion of the main housing, the inner portion of said first shield member having an upturned flange, a second shield member covering said bevel gear unit and having downwardly extending means to engage over said flange, and means to hold said second shield member in place over said bevel gear unit and thereby acting through said flange to hold the adjacent portion of said first shield member against outward movement relative to said main housing member away from said second shield members.

3. In a multi-rotor rotary stalk cutter having a main housing at least partially enclosing said rotors, and drive means for rotors including a shaft for each rotor extending upwardly from said housing, a bevel gear unit carried by said housing and including a frame supporting said unit above the level of the upper portion of said main housing, means extending downwardly from said unit and connected with the upper end of one of said rotor shafts to drive said one shaft, the upper end of the latter having a double groove pulley, a pair of belts disposed in said pulley grooves, and connected with pulleys on the upper end portions of the other rotor shafts above said main housing, a first shield member shiftably mounted on said main housing over at least one of said other rotor shafts and the associated belt or belts and movable on said main housing toward and away from said frame in applying and removing said shield member, the inner ends of the latter and the adjacent portion of said frame being complementarily shaped so as to interfit one with the other in the inner position of said shield member, interengageable tongue and clip means on the outer portion of said shield member and the adjacent portion of said main housing for holding the outer portion of said shield member in place, a second shield member shiftably mounted on said frame and movable thereon toward and away from a position covering said bevel gear unit, means on said frame and second shield member for latching the latter in position on said frame, and means on said second shield member engageable with said first shield member when said first shield member is in its inner position and said second shield member is in its latched position for holding said first shield member in said inner position.

4. The invention set forth in claim 3 further characterized by said last mentioned means comprising an upturned flange on the inner end of said first shield member and a portion of said second shield member overlapping said flange.

References Cited in the file of this patent

UNITED STATES PATENTS

| 2,763,116 | Flinchbaugh et al. | Sept. 18, 1956 |
| 2,816,410 | Nobles | Dec. 17, 1957 |

OTHER REFERENCES

John Deere 127 Gyramor Rotary Cutter OM-W39-758, pages 24-28.